United States Patent
Brombach et al.

(10) Patent No.: US 12,283,812 B2
(45) Date of Patent: Apr. 22, 2025

(54) METHOD FOR MONITORING AN ELECTRICITY SUPPLY GRID

(71) Applicant: Wobben Properties GmbH, Aurich (DE)

(72) Inventors: Johannes Brombach, Berlin (DE); Marcus Letzel, Achim (DE); Lukas Holicki, Stuhr (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 361 days.

(21) Appl. No.: 17/584,767

(22) Filed: Jan. 26, 2022

(65) Prior Publication Data
US 2022/0239149 A1     Jul. 28, 2022

(30) Foreign Application Priority Data
Jan. 26, 2021 (EP) .................................... 21153548

(51) Int. Cl.
*H02J 13/00*     (2006.01)
*G05B 15/02*     (2006.01)
(Continued)

(52) U.S. Cl.
CPC ........ *H02J 13/00002* (2020.01); *G05B 15/02* (2013.01); *H02J 3/003* (2020.01);
(Continued)

(58) Field of Classification Search
CPC ...... H02J 13/00002; H02J 3/003; H02J 3/004; H02J 3/381; H02J 13/00001;
(Continued)

(56) References Cited

U.S. PATENT DOCUMENTS

| | | |
|---|---|---|
| 2009/0240382 A1 | 9/2009 | Mitani et al. |
| 2011/0082654 A1 | 4/2011 | Dickens |

(Continued)

FOREIGN PATENT DOCUMENTS

| | | | | |
|---|---|---|---|---|
| CA | 2878335 A1 * | 1/2014 | ........... | F03D 7/0284 |
| CA | 3088831 A1 * | 8/2019 | ........... | G05B 19/042 |

(Continued)

OTHER PUBLICATIONS

R. Arghandeh et al. "Topology detection in microgrids with microsynchrophasors," 2015 IEEE Power & Energy Society General Meeting, Denver, CO, USA, 2015. (Year: 2015).*

*Primary Examiner* — Eman A Alkafawi
*Assistant Examiner* — Dilara Sultana
(74) *Attorney, Agent, or Firm* — Seed IP Law Group LLP

(57) ABSTRACT

The disclosure relates to a method for monitoring an electricity supply grid, wherein the electricity supply grid has a grid frequency and a grid topology with a plurality of grid nodes, a plurality of converter-controlled infeed units are each connected to the electricity supply grid via a grid connection point, and the grid connection points are distributed over the grid topology, comprising the steps of acquiring in each case at least one node voltage at the grid connection point or at a grid node, assigned to the grid connection point, of the plurality of grid nodes, such that a plurality of node voltages are acquired, wherein each grid connection point or grid node is assigned a location in the grid topology, which is referred to as node location, and the acquired node voltage is characterized by a node phase angle as phase angle of the node voltage, assigning an associated node location to each node voltage, and ascertaining grid statuses distributed over the grid topology from the acquired node voltages, each with an assigned node location, in (Continued)

particular from the node phase angles or phase relationships between at least two grid nodes.

17 Claims, 5 Drawing Sheets

(51) Int. Cl.
*H02J 3/00* (2006.01)
*H02J 3/38* (2006.01)

(52) U.S. Cl.
CPC .............. *H02J 3/004* (2020.01); *H02J 3/381* (2013.01); *H02J 13/00001* (2020.01); *H02J 2203/10* (2020.01); *H02J 2300/28* (2020.01)

(58) Field of Classification Search
CPC .... H02J 2203/10; H02J 2300/28; H02J 3/241; H02J 3/24; H02J 3/0012; G05B 15/02; Y02E 10/76
See application file for complete search history.

(56) References Cited

U.S. PATENT DOCUMENTS

| | | |
|---|---|---|
| 2014/0350873 A1 | 11/2014 | Litzinger et al. |
| 2015/0109836 A1 | 4/2015 | Hatakeyama et al. |
| 2016/0003879 A1 | 1/2016 | Wilson et al. |
| 2019/0024634 A1 | 1/2019 | Tarnowski |
| 2020/0044455 A1* | 2/2020 | Brombach ................ H02J 3/38 |

FOREIGN PATENT DOCUMENTS

| | | | | |
|---|---|---|---|---|
| CN | 111061827 A | * | 4/2020 | ............. G06F 16/29 |
| EP | 2629386 A1 | | 8/2013 | |
| WO | 2013/087122 A1 | | 6/2013 | |

* cited by examiner

METHOD FOR MONITORING AN ELECTRICITY SUPPLY GRID

BACKGROUND

Technical Field

The present invention relates to a method for monitoring an electricity supply grid. The invention also relates to a monitoring arrangement for monitoring such an electricity supply grid.

Description of the Related Art

Electricity supply grids are known. They serve to provide electric power generated by generators to consumers for consumption. Such electricity supply grids may be highly complex, such as for example the European integrated grid. A section of such a grid may however also be considered to be an electricity supply grid and monitored, such as for example the German or French electricity supply grid as part of the European integrated grid, to stay with the example. Such electricity supply grids have spatially distributed generators and thus feeders, and spatially distributed consumers. Both the power generated and fed in by generators and the power consumed by consumers may fluctuate on an individual basis, even between 0% and 100%.

This may lead to highly variable power flows in the electricity supply grid, and this may lead to oscillations and even to instabilities.

Electricity supply grids are conventionally structured such that they contain a plurality of large generators, in particular large power plants having synchronous generators, which are coupled directly to the electricity supply grid and thereby feed electric power into it. In this conventional structure, the operators of the power plants are often also the operators of the electricity supply grid or of a considerable portion of the electricity supply grid. For control purposes, there are therefore appropriate control centers that primarily control the generators, that is to say said large power plants. Smaller consumers are in this case taken into consideration on a more statistical basis, with larger consumers possibly being able to be taken into consideration specifically in terms of required power.

If unusual power fluctuations with unusual oscillations or even stability-critical situations occur, or other disturbances, then the control center is able to respond thereto. This is often performed by highly trained and experienced personnel in such a control center.

At least some electricity supply grids, or at least portions thereof, however develop into an electricity supply grid in which the portion of power fed in by renewable energy sources becomes ever greater. This in turn results in a wide variety of changes. Such renewable energy sources are in particular usually smaller but more widely distributed generators, have a fluctuating power, are sometimes connected by specific grid topologies and may respond in a highly individual manner to frequency and voltage changes in the electricity supply grid, specifically usually in a manner different from directly coupled synchronous generators.

This may also make it difficult for a control center to control the electricity supply grid as it did previously. It should in particular be highlighted that the electricity supply grid behaves differently than it did previously and that it is less possible to influence the electricity supply grid by controlling the large generators, in particular large power plants. By way of example, the stabilizing effect of directly coupled synchronous generators on the electricity supply grid decreases when its share decreases.

To address these problems, there are usually extensive grid connection rules that specify, for renewable energy sources, that is to say in particular wind power installations, wind farms and photovoltaic installations, how these have to behave in which situations. This includes in particular the behavior in the event of voltage changes, frequency changes and grid faults.

The problem of grid control however remains challenging, in any case in limit situations, and full use does not yet appear to have been made of the potential of jointly using renewable energy sources to control or at least observe the electricity supply grid.

The European Patent Office searched the following prior art in the priority application relating to the present application: US 2011/082654 A1, WO 2013/087122 A1 and EP 2 629 386 A1.

BRIEF SUMMARY

Provided are one or more techniques to improve the monitoring of an electricity supply grid, in particular using the potential possessed by renewable energy sources, at least wind power installations and/or wind farms. The intention is at least to propose an alternative solution to previously known solutions.

Provided is a method that relates to monitoring an electricity supply grid, wherein the electricity supply grid has a grid frequency and a grid topology with a plurality of grid nodes. A plurality of converter-controlled infeed units are furthermore each connected to the electricity supply grid via a grid connection point, and the grid connection points are distributed over the grid topology. The grid connection points may in this case be spaced from one another by several kilometers up to several hundred kilometers.

Converter-controlled infeed units are infeed units that use a converter to feed into the electricity supply grid. Such a converter may also be referred to as an inverter. In any case, the grid-side design of the converter-controlled infeed unit is of particular importance here. The converter or inverter may thus generate an AC current with an absolute value and phase and feed it into the electricity supply grid at the respective grid connection point. The following steps are proposed in order to perform the method. It is proposed to acquire in each case at least one node voltage at the grid connection point or a grid node, assigned to the grid connection point, of the plurality of grid nodes, such that a plurality of node voltages are acquired, wherein each grid connection point or grid node is assigned a location in the grid topology, which is referred to as node location. A plurality of grid nodes, in particular as many grid nodes as possible, are thus considered, and a respective node voltage is acquired there.

Appropriate measurement technology is often present at a grid connection point or a measurement is performed in any case. A grid connection point itself may thus also form a node location. However, it is also possible for a node voltage to be acquired at a grid node that does not directly form a grid connection point but is assigned thereto. Such an assigned grid node is in particular in the electrical vicinity of the grid connection point to which it is assigned. The node voltage of such a grid node may be acquired at the grid connection point by being measured at the grid connection point. The difference between the grid connection point and the assigned grid node may either be ignored or be subtracted out. Each grid connection point or grid node for which a node voltage is thus acquired is assigned a location in the grid topology, such that location-dependent node voltages are thereby ascertained. It is thus possible to create a comprehensive image of the node voltages.

The acquired node voltage is furthermore characterized by a node phase angle as phase angle of the node voltage. It is furthermore proposed to assign an associated node location to each node voltage and to ascertain grid statuses distributed over the grid topology from the acquired node voltages with a respectively assigned node location. This makes it possible to create an image of distributed grid statuses, that is to say an image of the grid statuses in a region of the electricity supply grid.

The distributed grid statuses may in particular be created from the relationships between the node voltages of different node locations. Distributed grid statuses are in particular power flows in regions of the electricity supply grid. In particular, a power flow between two node locations forms a grid status, and a plurality of such power flows between a corresponding plurality of node locations then form grid statuses distributed over the grid topology. A power flow may also be referred to synonymously as load flow. These terms are used here completely interchangeably.

It is however also possible to ascertain other grid statuses, such as grid disturbances, including their spatial assignment in the grid topology. Degrees of use of individual portions of the grid topology may also form grid statuses.

The specific topology, in particular temporary changes such as isolations of current paths, that is to say in particular transmission lines, may also form grid statuses of the grid topology. These grid statuses are thus acquired in a manner distributed over the electricity supply grid or the grid topology under consideration, and then allow a variety of conclusions and possibly measures, such as grid stabilization measures.

To this end, the acquired node voltages are considered in connection with their associated node location, such that each node voltage is assigned an associated node location. This may in particular be implemented in a database that contains a node location for each entry of a grid voltage. Conversely, a currently acquired grid voltage may also be specified for each node location.

It has in particular been identified that distributed grid statuses are able to be ascertained particularly well by observing the node phase angles. The node phase angles allow a particularly good comparison between node voltages of different node locations. A difference angle is able to be identified and evaluated particularly well here. The difference angle may be compared between a plurality of node locations comparatively independently of the voltage amplitude.

A node phase angle may form an angle that revolves with the AC voltage. If it is compared with a node phase angle of another node location, with both node phase angles to be compared revolving, the difference angle that results from this comparison is constant in the stationary or quasi-stationary state. This difference angle changes only in the case of transient processes.

A node phase angle is preferably considered to be a phase angle with respect to a reference angle. The reference angle, which may also be referred to as or be in the form of a global reference angle, may likewise revolve at the grid frequency. A likewise revolving angle of the node voltage may be compared with this revolving reference phase angle, and the deviation may be referred to as node phase angle. Such a node phase angle does not revolve at the grid frequency, but rather is a substantially constant value. It is constant in the stationary or quasi-stationary state, but may change in a transient state.

If the node phase angles are defined in this way, then a comparison with other node phase angles, that is to say of other node locations, may be made easier. If a comparison is performed, this gives the same result as if the respective revolving angles of the underlying node voltages were to be compared. In any case, it is preferably proposed for each node phase angle to describe a respective phase angle with respect to a reference phase angle of a voltage.

However, it is also possible not to acquire the node phase angles. By way of example, it is possible to consider equivalent values, such as times at which the respective node voltages have a zero crossing, and/or at which they have a predetermined phase angle.

Such times also characterize a phase position and allow a comparison with other grid nodes. It is then possible to consider the same relationships that have been described above to directly evaluate acquired node phase angles.

A relationship between the phase positions of the node voltages, that is to say between the grid nodes, is also important. A phase angle relationship between at least two grid nodes may in particular provide information about grid statuses. Such a phase angle relationship may however also be determined in a manner other than directly from acquired node phase angles. The described times of zero crossings or predetermined phase angles offer one option. However, it is also possible to compare node voltages, that is to say their signal profiles, directly with one another, in order thereby to determine their phase positions with respect to one another, and thus the phase angle relationships.

The grid statuses distributed over the grid topology are ascertained from the acquired node voltages. This may in particular be performed from the node phase angles, or in particular also, as described, from phase relationships between at least two grid nodes. The node phase angles are likewise distributed over the grid topology, and they thereby give a good image of the grid topology. This may be determined directly from the node phase angles, or indirectly, specifically through other described evaluations and/or by considering the phase angle relationships.

Said reference phase angle may be provided uniformly for all measuring or evaluation apparatuses, e.g. circuitry, that are intended to determine the node phase angles. It may be transmitted for this purpose, with different transmission delays being able to be subtracted out. It may also be generated independently using a highly accurate time signal from any unit, that is to say at any node location and thus any node voltage.

Revolving phase angles of any node voltage may in principle also be compared directly with one another if they are each assigned a highly accurate time signal.

According to one aspect, it is proposed for the ascertained grid statuses to comprise grid statuses from at least one bullet point in the following list.

Power flows between grid nodes may form grid statuses, that is to say a power flow between two grid nodes may form a grid status. A power flow may in each case be identified from the phase shift between two grid nodes, and this corresponds to the difference between two node phase angles, specifically of these two grid nodes. The specific power flow may in this case be derived with knowledge of the property of the transmission path, that is to say in particular of a transmission line, that is to say in particular of its impedance, or through one-off comparative measurements, which may of course be repeated.

Switching states defining the grid topology may form grid statuses.

Switching states defining the grid topology may thus be switching states that concern the topology, that is to say in particular connect or disconnect transmission paths. Connecting or disconnecting transmission lines in particular changes the grid topology, and the associated switching states are switching states defining the grid topology.

Transmission bottlenecks in the grid topology may likewise form ascertained grid statuses. Such transmission bottlenecks may be formed from knowledge of the grid topology and knowledge of the power flows. Further information may additionally be taken into consideration, such as advertised changes to the power draw of consumers, the power infeed of generators and also the grid topology. The latter may in particular be advertised disconnections of grid portions, for example for maintenance purposes.

A renewable infeed proportion may also be an ascertained grid status. A renewable infeed proportion describes a proportion of power fed in by renewable energy sources in relation to the total power fed into the grid topology or the grid portion. Such a renewable infeed proportion may be derived from the power flows and the associated knowledge of the topology. The power flows indicate how much power is flowing and where, and it is therefore possible to identify the feeder from which and thus the sort of feeder from which this power originates.

A conventional infeed proportion may be a grid status. A conventional infeed proportion denotes the proportion of power fed in by conventional generators, that is to say by directly coupled synchronous generators, in relation to the total power fed into the grid topology or the grid portion. The conventional infeed proportion may likewise be ascertained from identified power flows and knowledge of the grid topology, including the type and location of the feeders.

A further possible grid status is a grid load of the electricity supply grid or grid portion under consideration. A grid load indicates the magnitude of the consumed power in the electricity supply grid or grid portion under consideration. It may also be determined from the power flows. It is possible to derive power drains directly from the power flows and the power that is transmitted there in accordance with the power flows under consideration is thus consumed at the power drains.

According to one aspect, it is proposed to determine at least one forecast regarding at least one expected local level of grid use and/or at least one expected transmission bottleneck in the grid topology on the basis of the ascertained distributed grid statuses and optionally on the basis of at least one weather forecast. It has in particular been identified here that it is possible not only to acquire an actual status from the distributed grid statuses, but also to be able to derive expected situations. An expected local level of grid use, and also an expected transmission bottleneck, have in this case been identified as particularly important situations, and it is therefore proposed to determine a forecast for them.

It has also been identified that renewable energy sources are increasingly jointly defining the energy supply, and thus also jointly influencing the operation of the electricity supply grid. Renewable energy sources are in particular wind power installations or wind farms and photovoltaic installations. Their operation, and thus power able to be fed in, may depend greatly on the weather. It has thus been identified that the spatial distribution of the power infeed may also depend on the weather. Local changes in the power infeed, and thus in the power transmission, and a change of power flows may thus be identified on the basis of a weather forecast.

Such local changes may result not only from a local weather forecast. On the contrary, it has also been identified that local changes may result from the fact that renewable generators and conventional generators are not distributed evenly over the grid topology, and thus an increase or decrease in power fed in by renewable energy sources may lead overall to a local shift in the power infeed. If the wind picks up, the power fed in at the locations at which wind power installations or wind farms feed in increases.

A forecast regarding at least one expected local level of grid use may already be derived from the ascertained distributed grid statuses. These grid statuses make it possible to draw conclusions about power flows, or the power flows may themselves form grid statuses, and it is also possible to conclude as to the behavior of connected consumers therefrom. Such behavior may be observed through continuous monitoring over several days or even longer time intervals, and a typical behavior may be derived therefrom. A behavior of such consumers may thus be predicted therefrom. From this alone, it is possible to predict local changes, which in turn influence the local level of grid use. It is thus possible to predict an expected local level of grid use therefrom, and at least a forecast is able to be determined for it.

If a weather forecast is additionally jointly incorporated, then a change in fed-in power may be predicted in addition, or else as sole criterion, and a local level of grid use is also able to be predicted based on the spatially distributed grid statuses, or a forecast is able to be determined for it. If the level of grid use at a location is thus known, and a weather forecast makes it possible to conclude as to a change in fed-in wind power that is relevant to this location, the change in the level of grid use at this location is also able to be forecast. It has likewise been identified that a forecast regarding at least one expected transmission bottleneck in the grid topology is possible. Likewise, as has been explained above for predicting a local level of grid use, it is also possible to make forecasts regarding power transmission. Transmission capacities, for example of long-range transmission lines, are also known. As a result, an expected transmission bottleneck may be predicted, for example from an excessively high level of grid use at a location. It is thus possible to determine a forecast regarding an expected transmission bottleneck.

According to one aspect, it is proposed for each node voltage to be assigned a highly accurate measurement time with an accuracy of one five-hundredth, or more accurate. The accuracy is thus at least 0.002 of the period duration of the grid frequency, or is more accurate.

In addition or as an alternative, it is proposed to take a common reference time as a basis for acquiring the node voltages of all node locations, in order to give the ability to compare the times of the node voltages, wherein the common reference time is provided in particular by a common time signal, in particular by a time signal of a GPS. In order to ascertain grid statuses distributed over the grid topology, the ability to compare the times of the acquired node voltages with one another is important, in particular the ability to compare the acquired node phase angles of the node voltages.

A highly accurate measurement time may be used to achieve this. A common grid frequency is 50 Hz, and the inverse grid frequency is thus a time, specifically 0.02 seconds. One twentieth thereof is thus 1 ms. The highly accurate measurement time is thus accurately assigned at least to 1 ms, and thus deviates from an exact time by at most 1 ms. In the case of a grid frequency of 60 Hz, which is likewise common, this thus gives a slightly smaller value of around 0.83 ms.

The inverse grid frequency is thus the period duration. An inaccurate measurement time may cause a shift in the recorded sinusoidal profile of the grid voltage. This shift is limited to one five-hundredth of the period duration when the measurement time has an accuracy of one five-hundredth of the inverse grid frequency, that is to say the period duration, or is more accurate. In other words, this results in a maximum error of 0.72° for the phase angle distorted by a shift. This one five-hundredth of the inverse grid frequency is thus the accuracy that should at least be used. A higher accuracy is preferably selected.

One alternative possibility is taking the common reference time that is provided to all measuring units as a basis. A global positioning system (GPS) not only delivers exact positions, but also transmits such a reference time. Receiving the reference time from a GPS is thus a simple implementation option. In the variant of taking a common reference time as a basis, what is important is not an absolutely high accuracy, but rather the fact that all node voltages, and thus all node phase angles, are acquired or determined based on the same time. If there is a time deviation from an absolute time that is however the same for all node voltages and node phase angles, the error is removed when comparing the node voltages and node phase angles with one another.

According to one aspect, it is proposed for a node phase angle to be acquired for each node location. The node phase angle may thus be present as such for each node location and in particular be used to ascertain the distributed grid statuses.

In addition or as an alternative, it is proposed for a common reference angle to be provided for the node voltages of all node locations, and for each node phase angle to be determined as an angle shift with respect to the reference angle, and/or for a local phase angle difference to be determined as difference between the respective node phase angles for in each case two node locations, and in particular for a power flow in a connection path to be determined from at least one local phase angle difference between two node locations connected via the connection path.

The node phase angle is thus a fixed value if a stationary or quasi-stationary state is present. Such a node phase angle is thus determined for each node location, and thus for each node voltage or each node phase angle. As a result, there are then a large number of node phase angles in the form of substantially constant values distributed over the grid topology. These may give a good overall image of the electricity supply grid or the grid portion under consideration.

A local phase difference between two node phase angles, that is to say therefore a phase angle difference between two node locations, may give information about the power flow between these two node locations. If these two node locations are connected to one another via a power flow path, in particular a direct line, then the power flow through this line may thereby be acquired directly. A large number of power flows distributed over the electricity supply grid or the grid portion under consideration, that is to say distributed over the grid topology, may be acquired in this way. This results in a comprehensive image of the geographical distribution of a large number of power flows. This may give a good basis for further evaluations, including evaluations as have already been explained above.

According to one aspect, it is proposed for a plurality of wind power installations or wind farms, at the electricity supply grid, to be connected to the electricity supply grid in each case via one of the grid connection points, and each to have an installation control system for controlling the wind power installation or a central farm control system for controlling the wind farm, wherein voltage values acquired by the installation control system or the central farm control system are used to acquire in each case one of the node voltages. Such a wind farm feeds into the electricity supply grid and also has accurate measurement technology in order to accurately acquire the voltage in terms of absolute value and phase. A central farm control system may additionally be used for evaluation.

Such a wind farm may thus record the voltage at the grid connection point, and this may form a node voltage. It may also be evaluated, in particular with regard to node phase angle that is able to be acquired. It is also possible to receive or generate an accurate time signal or to receive a reference angle as reference angle signal using such a farm control system.

Such farm control systems are furthermore often connected to a control center via a SCADA system, such that the acquired node voltage and the node phase angle are able to be transmitted. It is also possible to assign the associated node location using the identifier of the wind farm. Many wind farms are able to perform all this, and node voltages and node phase angles may thereby be acquired at a large number of node locations, in order to combine all these values to form a comprehensive image of the grid topology. Such a comprehensive image may thus be created without needing to install additional hardware.

All these explanations regarding the wind farm with a central farm control system should also be understood in the same sense for the wind power installation with an installation control system.

According to one aspect, it is proposed for a grid status image to be created from the node voltages and the respectively assigned node location, which grid status image reflects the grid statuses distributed over the grid topology, in particular reflects power flows distributed over the grid topology. The grid status image may also be referred to synonymously as depiction of grid statuses distributed over the grid topology. It may be a geographical depiction in the sense of a map, in which the power flows, or other grid statuses, are plotted at the respectively acquired locations.

Instead of a geographical chart or map, it is also possible to use a functional chart or a structured chart of the grid topology that contains the node locations, including their connections and of course the grid statuses to be depicted, without the arrangement of the node locations on such a depiction however being a true-to-scale reflection of the actual geographical distribution.

Such a grid status image, which may moreover also be calculated over a time, that is to say in particular without directly acquiring node phase angles, may thus give a good overview of the grid statuses of the grid topology. In particular in the case of power flows, this thus results in an overall image that also allows conclusions as to sources and drains. Bottlenecks or at least high power flow densities are also easily identifiable. A grid status image may however preferably also be digitized such that the data are able to be processed further by a machine.

It is in particular proposed for in each case one of the node voltages to be described by a voltage vector with a time signal. Such a voltage vector indicates the amplitude of the acquired voltage with its length and the node phase angle with its direction. The voltage vector may in particular revolve at the grid frequency, such that the node phase angle also changes constantly, that is to say revolves at the grid frequency. A time signal is assigned to this voltage vector, such that a large number of voltage vectors of a large number of voltage nodes are able to be compared using the time signal. Otherwise, there would be the risk, when comparing a plurality of revolving voltage vectors, of voltage vectors from different times being compared. The comparison between the phase angles of these voltage vectors would in particular then no longer be meaningful. This is avoided by using the time signal.

It is thus proposed to determine such voltage vectors for each of the node locations and to evaluate the voltage vectors centrally. A central computer may in particular be used for this. If for example wind farms are involved, then one of the central farm computers of the wind farm may form this central computer. It is also possible for a control center to perform the central evaluation, in particular to have a central computer.

The grid status image may be created from these voltage vectors, which are thus tuned to one another using the time signal, that is to say synchronized, and the respectively assigned node location. As an alternative possibility, it is proposed here to transmit or to use respective times with respectively assigned phase angles and optionally a current grid frequency at the node locations. The transmitted or known grid frequency makes it possible to ascertain mutual phase relationships. An angle difference between the voltages of the two node locations may be calculated from the time difference, which may for this purpose be multiplied by the frequency and 360° in order to obtain the angle difference in °.

An image of the node voltages and node phase angles may first be created as intermediate product. This is however provided only as an option.

Grid statuses may then also be determined from the node voltages with a respectively assigned node location. From two respective voltage vectors with in each case two assigned node locations, a power flow between these two node locations may in particular be ascertained as grid status. A large number of grid statuses distributed over the grid topology may thus be determined and then combined to form the grid status image.

According to one aspect, it is proposed for the grid topology to have a plurality of spatially distributed transmission nodes, wherein one transmission node may in each case correspond to one of the grid nodes, and for a or the grid status image to have a grid group assignment of existing wind power installations or wind farms that in each case at least indicates, for a plurality of the transmission nodes, those wind power installations or wind farms to which it is connected without any interconnection of a further transmission node. It is thereby possible to perform technically expedient grouping, in which basically all wind power installations and wind farms that transmit their power via the same transmission node are combined in a group. A transmission node may thus be understood to be a specific grid node at which at least three current paths, in particular lines, meet. Each grid node and transmission node is a node in the sense of Kirchhoff's node law.

A transmission node may in particular form a grid node at which infeed currents from a plurality of generators, in particular decentralized generators such as wind power installations or wind farms, are combined.

In addition or as an alternative, provision is made for the grid status image to reflect the current grid topology. The advantage of this is in particular that the grid status image comprises the entire grid topology and provides spatially distributed information exactly for this, in particular assigns or displays the grid statuses. Such a current grid topology may also contain an above-described group formation, such that the two mentioned features may thereby be combined.

A large amount of information may also in particular be provided and used from a grid status image containing or for the current grid topology. The depiction of the current grid topology may also contain the fact whether grid portions or transmission links are isolated or closed. It could also contain connected or disconnected grid portions, feeders and/or consumers, specifically in particular whether these are connected or disconnected. Such a grid status image then plots the corresponding grid statuses, in particular the explained power flows. The current grid situation is thereby able to be depicted well and in a spatially assigned manner.

According to one aspect, it is proposed for a time-dependent and location-dependent power forecast for available and/or required power, which indicates a respective temporal forecast, in particular a temporal profile of a forecast for power able to be provided and/or required for some or all grid nodes and/or transmission nodes, to be created on the basis of the acquired node voltages and optionally on the basis of a weather forecast and/or of a demand forecast. To this end, it is furthermore proposed for the forecast for power able to be provided in particular to be a forecast for power able to be provided by the converter-controlled infeed units, in particular a forecast for power able to be provided by wind power installations and/or wind farms.

It is thus proposed to create a time-dependent and location-dependent power forecast. This power forecast indicates how much power is available and/or required where in the grid topology, that is to say where in the electricity supply grid or grid portion under consideration. The power forecast may thus concern both the feeders and the consumers. This takes place based on the acquired node voltages, that is to say in particular also based on the node phase angles. It is thereby possible not only in general to create a comprehensive image in particular of power flows, but also to be able to forecast changes. Such forecasts may already be derived from values recorded in the past, in particular for the distributed power flows. Even the available power from renewable generators may be estimated to a certain degree. In particular for photovoltaic installations, it may be estimated that these generate electricity throughout the day but not at night. This statement is possible even without a weather forecast.

An improvement is however achieved if a weather forecast is also used. Its influence on local power forecasts has already been explained above. Since a weather forecast may also be recorded over a time interval, this also results in a time dependency.

A demand, that is to say how much power connected consumers require where and over what time intervals, may be derived from relationships that are recorded earlier. A pattern is often able to be identified in particular if the distributed grid statuses, in particular power flows, have already been recorded over several days or even weeks, months or even years. For example, cycles of energy-consuming factories repeat. Cities also have patterns as to when how much power is required.

A demand forecast may additionally be incorporated. Although a demand forecast may also contain such known patterns, it may additionally contain power requests if for example industrial consumers specify time intervals with particular powers. Such power demands may in particular be requested from electricity traders, and corresponding demand forecasts may then also be created there.

Thus, by additionally taking into consideration a demand forecast that contains a power demand both for specific consumers and/or locations and for time intervals, in particular a time-dependent and location-dependent power forecast for required power or this part of the power forecast may be created. The power demand may however also be incorporated into the power forecast for available power.

If for example demand peaks are identified at particular times, then this may result in corresponding power plants being prepared to cater for such demand peaks. It is in particular possible for example for a gas power plant to be put into operation for this purpose. The location of such a gas power plant, to stay with the example, is known, and if it is known that it is put into operation to cover a demand peak and corresponding power is fed in, that is to say the power is available, this may be incorporated into the time-dependent and location-dependent power forecast.

However, it is in particular proposed for the time-dependent and location-dependent power forecast for available power, or this portion of the power forecast, to relate to the forecast for power able to be provided by converter-controlled infeed units. Converter-controlled infeed units are usually those of renewable energy sources, which are in turn usually fluctuating energy sources. For this, it is important to forecast available power for this purpose, in order also to be able to derive a degree of grid use. In particular wind power installations and wind farms may provide a significant amount of power, and in the process at least locally influence the electricity supply grid. It therefore makes sense to take this into consideration and plan using the time-dependent and location-dependent power forecast.

According to one aspect, it is proposed for the grid status image to comprise the time-dependent and location-dependent power forecast. This time-dependent and location-dependent power forecast is thus able to be acquired well. The time-dependent consideration in the grid status image may be achieved in that the grid status image consists of a plurality of partial images, a respective one of each of which shows the entire grid topology, but is assigned to a particular time. A grid status image that depicts grid statuses, in particular power flows, may in particular be improved or enhanced by the time-dependent and location-dependent power forecast.

According to one aspect, it is proposed for the electricity supply grid to be controlled on the basis of the acquired node voltages, in particular on the basis of the grid status image. The control may in particular be performed by virtue of the fact that the electricity supply grid is controlled so as to actuate switches of the electricity supply grid in order to change the grid topology, and/or that one, several or all of the converter-controlled infeed units are controlled.

Such switches may in particular be line circuit breakers, and the grid topology may thereby be changed. By way of example, transmission lines may thereby be activated or deactivated. Actuating the switches may also involve scheduled deactivations being prevented or shifted to a more suitable time.

It has in particular been identified here that power flows may lead to bottlenecks, in particular when transmission lines or other power flow paths are disconnected and power flow peaks that are possibly too high or get too close to an upper limit may thereby occur at other locations. Switching appropriate switches may then possibly form a new path, or a transmission line at risk of overloading is disconnected from a section of the supply grid, such that no power is able to flow over this transmission line at risk of overloading from this disconnected section.

However, it has also been identified that there is another alternative that may be combined with the switching of the switches in the electricity supply grid, specifically that of controlling converter-controlled infeed units. Converter-controlled infeed units are in particular infeed units of or having renewable energy sources, in particular wind power installations and wind farms. These are distributed over the electricity supply grid or the grid topology and may also be used to acquire all of the node voltages and node phase angles. They are then incorporated into the method anyway for monitoring purposes and may then also be jointly used for control purposes.

It has also been identified in this case that in particular overloading may be hazardous for grid stability. Overloading may occur due to an excessively large power flow in a transmission path, in particular on a transmission line. If a power flow exceeds a limit value here, this may result in automatic disconnection through a prescribed safety deactivation. If a transmission line is disconnected in this case, the power flow—which is then large in any case—looks for a new path, where there may likewise be an increase in the power flow and resulting disconnection. The remaining transmission lines will then have even greater problems in transmitting the power flows.

It has in particular been identified here that such problems may arise comparatively quickly. A power flow may rise quickly and reach a first limit value and, a short time later, a second limit value, which leads to the deactivation. Wind power installations are in this case very fast regulation units that are able to reduce their power very quickly and are thereby capable of reducing a corresponding power flow quickly enough to prevent the second stage, mentioned by way of example, being reached.

However, it is also possible for the power already to be reduced early, before a first limit is reached. Plus, wind power installations and wind farms, or even other converter-controlled infeed units, are usually locally widely distributed. It is thereby possible to intervene and reduce the power in a targeted manner at the specific locations at which an increased power flow may occur or does occur. The proposed method may thereby in particular be very useful for monitoring an electricity supply grid. Specifically, it is able to identify local grid statuses and thus also initiate countermeasures in a targeted manner.

According to one aspect, it is proposed for the grid statuses ascertained from the acquired node voltages, in particular ascertained power flows, to be compared with measured grid statuses or grid statuses ascertained from measured values other than the node voltages, so as to perform a grid status comparison with identical grid statuses that are however acquired differently. Building on this, it is proposed for the ascertainment of the grid statuses from the acquired node voltages to be adapted on the basis of the grid status comparison in order to improve an accuracy of the grid statuses.

It has in particular been identified here that the acquisition of the grid statuses, in particular the power flows, is able to be performed quickly and simultaneously at a large number of node points, and may thus be combined to form a comprehensive image. The specific measurement of grid statuses, or the acquisition of the grid statuses in other ways, may however possibly take place with higher accuracy. Current and voltage may be specifically measured in particular on transmission lines.

The specific measurement of the transmitted current on the transmission line, mentioned by way of example, and the measurement of the voltage dropped across the transmission line in the process, that is to say the measurement of the voltage at the start and at the end of the line, may also lead to a high accuracy. It is also possible to perform a power measurement directly. Such measurements may also be performed temporarily, using mobile measuring instruments. It is in particular possible for newly installed transmission lines or other transmission paths to be measured, to cite a further example. Such measurements may however often be performed individually and/or in a manner such that these measurements are not incorporated directly into a comprehensive monitoring system or incorporated into a control system. In other words, such measurement results are often available only offline, even if such a measurement is intended to be performed continuously or the measuring apparatus is installed permanently.

It is thus then proposed to use such highly accurate measurements in order to improve the accuracy of the faster and more comprehensive measurements that are able to be performed continuously, that is to say the acquisition of the node voltages and derivation of the grid statuses therefrom. It is in particular thus proposed to adapt the ascertainment of the grid statuses from the acquired node voltages.

It is in particular possible to ascertain the grid statuses from the acquired node voltages using a calculation rule, and this calculation rule may be adjusted, that is to say adapted, on the basis of the grid status comparison. Such a calculation rule is thus adapted on the basis of these more accurate measurements, that is to say based on these more accurate measurements.

Such an adaptation may for example be performed such that, in the grid status comparison, a ratio is formed between a grid status ascertained from acquired node voltages and a measured grid status or grid status ascertained from other measured values. A ratio is thus formed between a potentially less accurately acquired grid status and a more accurately acquired grid status. This ratio may then lead to a correction, in the simplest case to a correction factor for the calculation rule. The correction factor may in particular correspond to the reciprocal of the ascertained ratio.

However, other options are also possible, such as for example adjusting out a deviation between these two grid statuses that are compared in the grid status comparison using a controller with an integral component. For this purpose, this controller with an integral component may receive a deviation as input variable, specifically as control error, and determine a controller output therefrom, this for example being multiplied by the grid status ascertained from the acquired node voltages. This makes it possible to achieve a situation whereby, in this case too, the multiplication is performed by a correction factor, but this correction factor then also stays the same if it has managed to reduce the difference between the two differently acquired grid statuses to zero.

Of course, other options are also possible, for example adapting the calculation rule, when it is more complex, in terms of internal parameters. It is in particular possible here for the calculation rule to comprise a model of the grid portion under consideration, containing the corresponding grid nodes and the ascertained grid status. Of course, it is also possible for a calculation rule to determine a plurality of grid statuses for a plurality of locations from more than two node voltages. This may be performed using a correspondingly complex model of the section of the electricity supply grid in which these nodes or node locations are present and the grid statuses are intended to be determined.

Parameters of this calculation rule, in particular the underlying model, may then be adapted. By way of example, in the case of the more accurate measurements of the grid status, it is possible to derive a value for component variables, such as for example values for impedances involved. When measuring a power flow in a transmission line, its impedance may be determined. This may possibly be performed for a plurality of transmission lines in the case of a corresponding plurality of measurements. Such an impedance or the plurality of impedances, or other parameters, may be part of the calculation rule, in particular of an underlying model. Precisely these values may be adapted based on the more accurate measurements.

A monitoring arrangement for monitoring an electricity supply grid is also proposed. This monitoring arrangement proceeds from an electricity supply grid that has a grid frequency and a grid topology with a plurality of grid nodes. A plurality of converter-controlled infeed units are each connected to the electricity supply grid via a grid connection point, and the grid connection points are distributed over the grid topology. In a manner adapted thereto, the monitoring arrangement comprises a plurality of acquisition apparatuses, configured to acquire in each case at least one node voltage at the grid connection point or at a grid node, assigned to the grid connection point, of the plurality of grid nodes, such that a plurality of node voltages are acquired, wherein
each grid connection point or grid node is assigned a location in the grid topology, which is referred to as node location, and
the acquired node voltage is characterized by a node phase angle as phase angle of the node voltage,
at least one assignment apparatus configured to assign an associated node location to each node voltage, and
a central evaluation apparatus configured to ascertain grid statuses distributed over the grid topology from the acquired node voltages, in particular node phase angles, in each case with a respectively assigned node location.

The acquisition apparatuses, e.g. voltmeter, multimeter, voltage sensor, probe or clamp, are distributed over the electricity supply grid or over the grid topology. They may be formed by acquisition apparatuses of wind power installations or wind farms, in particular by acquisition apparatuses of the converter-controlled infeed units. They may in particular each measure a voltage at the grid connection point. This voltage forms the node voltage. It may be measured directly, or it may for example be acquired by performing measurements on a low-voltage side of a transformer at the grid connection point and calculating the node voltage as voltage on the high-voltage side of the transformer.

In any case, the acquisition apparatus is configured to acquire the node voltage in this way. It is thus programmed and, when it is put into operation, it also performs this acquisition. It is likewise configured to acquire a node phase angle. This in particular means that the node voltage is acquired with sufficient accuracy, specifically such that either the node phase angle is acquired directly by way of a measuring apparatus or that the sinusoidal voltage signal is acquired with such an accurate and high resolution and sufficiently high sampling that a phase angle is able to be derived therefrom. To this end, an appropriate computing unit may be part of the acquisition apparatus, and a node phase angle may be ascertained from an acquired sinusoidal voltage signal.

Provision is optionally made for an angle determination apparatus, e.g. circuitry, that is configured to acquire a node phase angle as phase angle of the acquired node voltage. This is thus provided when node phase angles are acquired. It may be an individual one that is arranged centrally, or one angle determination apparatus may be present in each acquisition apparatus. If it is present at the acquisition apparatus, it may form part of this acquisition apparatus and may be implemented by an appropriately implemented calculation rule.

However, it is also possible for the node voltage to be transmitted in each case to a central center together with a highly accurate time signal. A corresponding sinusoidal signal of the voltage is then thus in particular transmitted, and the node phase angle may then be acquired for each node voltage at the central center, if it is even acquired at all.

Provision is made for an assignment apparatus, e.g. circuitry, that is configured to assign an associated node location to each node voltage. To this end, the assignment apparatus may be arranged in the acquisition apparatus or form part of the acquisition apparatus. It may assign an identifier there to the node voltage, and in particular also to the node phase angle, in a data packet. The identifier may for example be a number from consecutive numbering of the node locations. The identifier may also identify the converter-controlled infeed unit that acquired the node voltage, in order thereby to achieve an assignment.

The assignment apparatus may however also be arranged at a central center. To this end, each acquisition apparatus may transmit the node voltage and the node phase angles, specifically to the assignment apparatus or a central reception apparatus in which the assignment apparatus is arranged. Upon receiving the node voltage and the node phase angle, the source, that is to say the sender, that is to say the specific acquisition apparatus that sent these data, is in this case known and, depending thereon, the assignment apparatus may then assign the associated node location to the node voltage thus received and to the node phase angles thus received. The assignment apparatus may for this purpose have an appropriate assignment program that is implemented. The assignment apparatus is in particular configured such that it performs this assignment as soon as it is put into operation and receives the node voltage.

The central evaluation apparatus may for example be arranged at a control center, or in a central farm computer of a selected wind farm. It may receive the node voltages and node phase angles of all of the acquisition apparatuses and ascertain the grid statuses distributed over the grid topology therefrom. This functionality may also be implemented in the evaluation apparatus. The functionality comprises taking into consideration the assigned node locations.

The assignment apparatus may be part of the central evaluation apparatus or be linked thereto.

The monitoring arrangement thus contains in particular the central evaluation apparatus that is networked with the acquisition apparatuses. The angle determination apparatus may be provided in the central evaluation apparatus, or a respective angle determination apparatus may be provided at each acquisition apparatus. In any case, the at least one angle determination apparatus is likewise part of the network. The assignment apparatus may also be provided centrally at or in the evaluation apparatus, or a large number of assignment apparatuses may be provided, such that a respective assignment apparatus is provided at an acquisition apparatus or forms part thereof. In any case, the at least one assignment apparatus is also part of the network.

According to one aspect, it is thus proposed for the monitoring arrangement to contain at least one angle determination apparatus, configured to acquire a node phase angle as phase angle of the acquired node voltage.

It is in particular proposed for the monitoring arrangement to be configured to perform a monitoring method according to at least one embodiment described above. To this end, corresponding functionalities may be implemented on the acquisition apparatuses, the at least one angle determination apparatus, the at least one assignment apparatus and/or the central evaluation apparatus. Central functions, such as determining the grid statuses and function, which take into consideration a plurality of node voltages or node phase angles, are in particular implemented in the central evaluation apparatus.

Functionalities such as taking into consideration or assigning a time signal may be implemented in each acquisition apparatus. To this end, each acquisition apparatus may have a highly accurate timing apparatus, in particular a clock, and/or a receiver for a common time signal, in particular a GPS receiver.

BRIEF DESCRIPTION OF THE SEVERAL VIEWS OF THE DRAWINGS

The disclosure is explained by way of example in more detail below on the basis of embodiments with reference to the accompanying figures.

DETAILED DESCRIPTION

Figure 1:
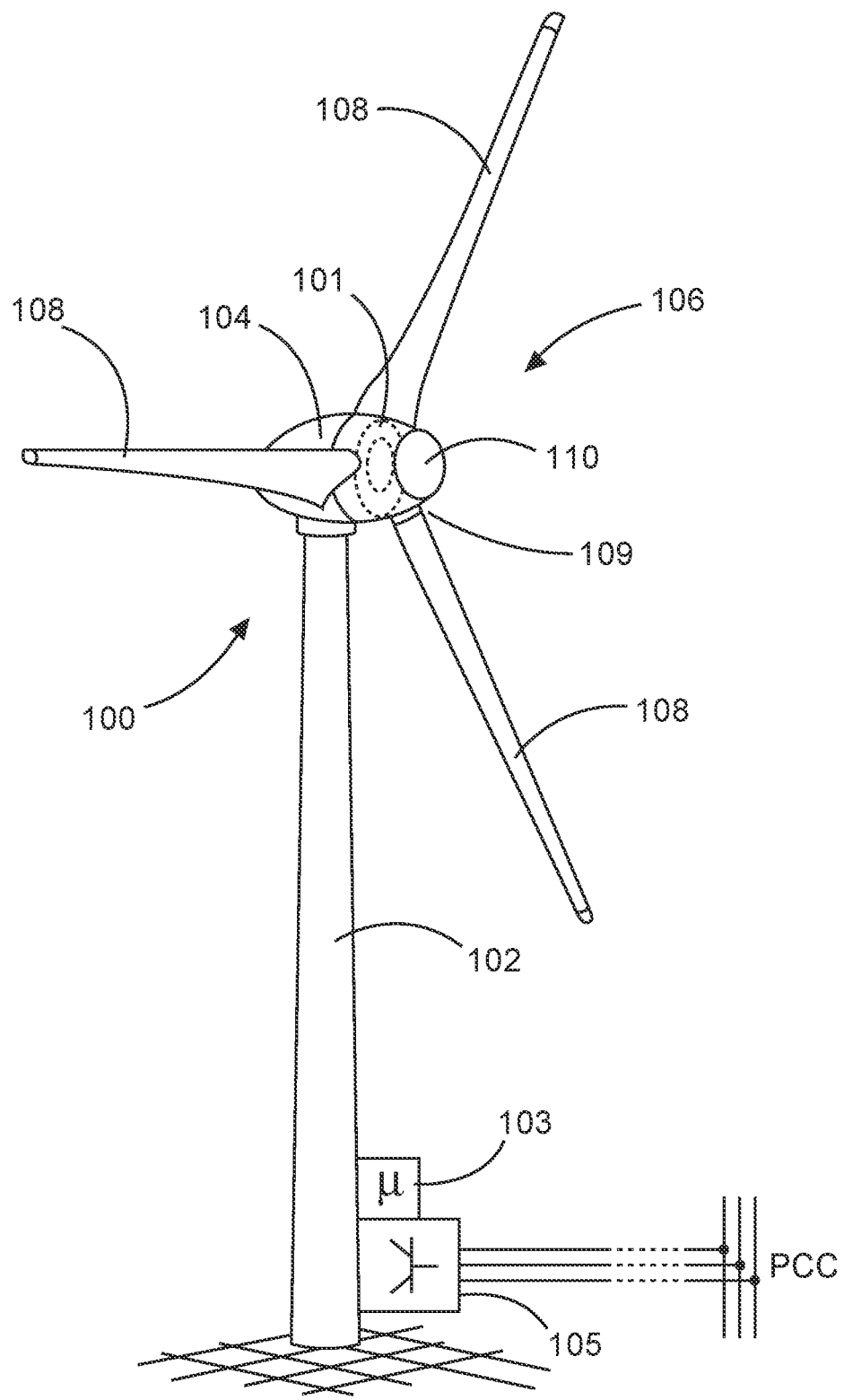
FIG. 1 shows a perspective illustration of a wind power installation.

FIG. 1 shows a schematic illustration of a wind power installation according to the disclosure. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point PCC. This may be performed directly or else together with other wind power installations in a wind farm. Provision is made for an installation control system 103 for controlling the wind power installation 100 and also the infeed unit 105. The installation control system 103 may also receive predefined values from an external source, in particular from a central farm computer. The infeed unit 105 may form or comprise an acquisition apparatus.

Figure 2:
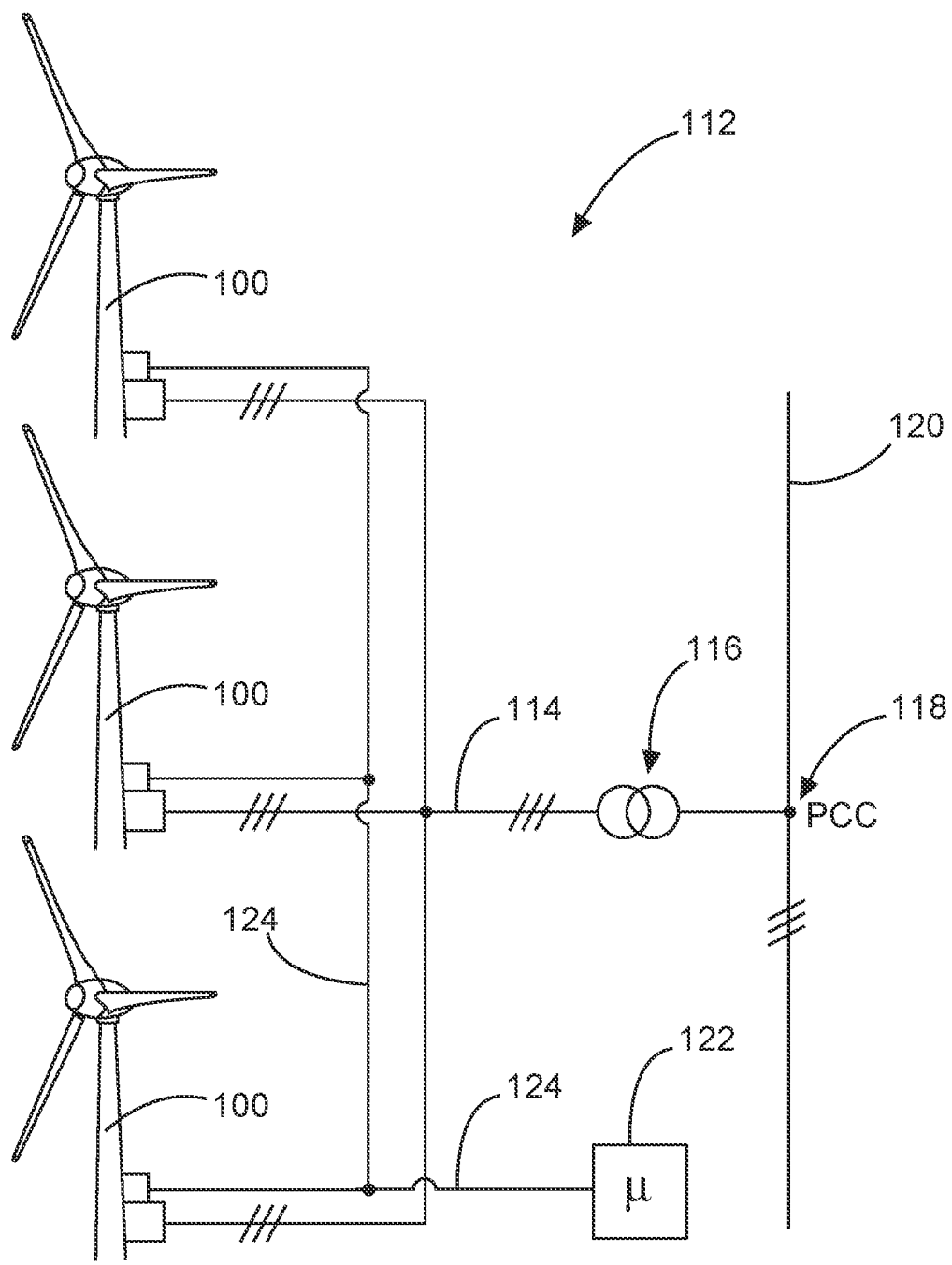
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added together and a transformer 116, which steps up the voltage in the farm, is usually provided in order to then feed into the supply grid 120 at the infeed point 118, which is also generally referred to as a PCC. FIG. 2 is only a simplified illustration of a wind farm 112, which does not show for example a control system, although a control system is of course present. By way of example, the farm grid 114 may also be designed in another way by virtue of for example a transformer also being present at the output of each wind power installation 100, to mention just one other exemplary embodiment.

The wind farm 112 additionally has a central farm computer 122. This may be connected, via data lines 124 or wirelessly, to the wind power installations 100 in order to interchange data with the wind power installations via this connection and, in particular, to receive measured values from the wind power installations 100 and transmit control values to the wind power installations 100. The central farm computer may form or comprise an evaluation apparatus.

Figure 3:
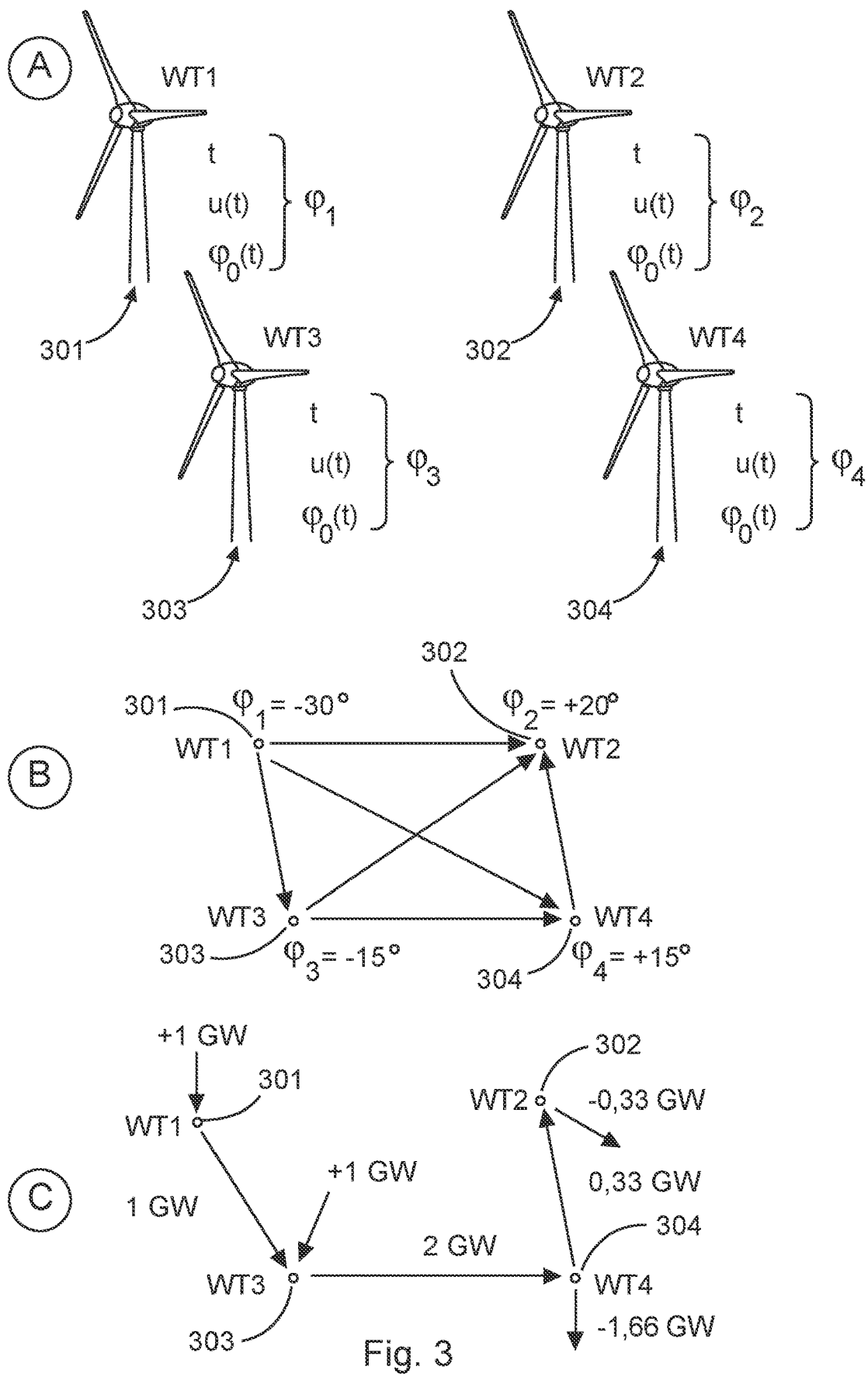
FIG. 3 shows three illustrative partial illustrations A, B and C for four observation nodes, four node phase angles and what is able to be derived therefrom.

FIG. 3 shows, in the three partial illustrations A, B, and C, in each case the same arrangement of four exemplary observation nodes 301 to 304. In the example, each of these observation nodes 301 to 304 forms a grid connection point for a wind power installation.

The wind power installations are each marked as WT1 to WT4. Each wind power installation, which may also be representative of a wind farm, acquires the time t with a highly accurate resolution. The voltage u(t) is also measured constantly. A reference phase angle $\varphi_0(t)$ is also acquired. The acquisition of this reference phase angle $\varphi_0(t)$ is identical at all observation nodes 301 to 304, and thus at each of the wind turbines or wind power installations WT1 to WT4. The acquired voltage u(t) has a revolving phase angle, and the reference phase angle $\varphi_0(t)$ likewise revolves. A fixed node phase angle $\varphi_1$ to $\varphi_4$ is able to be acquired therefrom. The node phase angles $\varphi_1$ to $\varphi_4$ thus form the node phase angles of the corresponding observation node 301 to 304. It is thus possible to determine a respective one of the node phase angles $\varphi_1$ to $\varphi_4$ from the acquired variables t, u(t) and $\varphi_0(t)$. This is illustrated in the first part A of FIG. 3 for each of the four wind power installations WT1 to WT4.

In the second portion B of FIG. 3, four values for the node phase angles have been assumed by way of example, specifically $\varphi_1=-30°$, $\varphi_2=+20°$, $\varphi_3=-15°$ and $\varphi_4=+15°$. For the theoretical assumption that all of these observation nodes 301 to 304 are connected to one another, this would result in each case in a direct power flow from one observation node to all of the other observation nodes that have a larger node phase angle. This is indicated by the corresponding arrows in the second portion B.

The third part C of FIG. 3 then shows power flows for the assumption that not all observation nodes 301 to 304 are connected to one another. It is assumed here that there is only a connection between the observation nodes 301 and 303, 303 and 304, and 304 and 302. Assuming in each case existing connecting lines with the same impedance, this results, in the example shown, in a difference between two node phase angles with a magnitude of 15° leading to a power transmission of 1 GW.

There is accordingly a power flow of 1 GW from the observation node 301 to the observation node 303. 1 GW may thus be fed in in the observation node 303, and this power flows to the observation node 303.

A power of 1 GW is likewise fed in at the observation node 303, and is thus added to the power that the observation node 303 has already received from the observation node 301. These 2 GW then flow from the observation node 303 to the observation node 304. On this link, this accordingly results in a difference between the node phase angles of 30°, specifically from $\varphi_3=-15°$ to $\varphi_4=+15°$.

At the observation node 304, it is thus assumed that 1.6 GW are dissipated, that is to say consumed, this being marked by −1.66 GW on the observation node 304.

The remaining ⅓ GW then flows from the observation node 304 to the observation node 302. Another ⅓ GW is thus consumed at the observation node 302, this being marked by −0.33 GW. Only a value of 5° accordingly results as the difference between the two node phase angles $\varphi_4$ and $\varphi_2$. The node phase angle $\varphi_4$ is thus 15° and the node phase angle $\varphi_2$ is 20°.

The illustration is of course a simplification, and in particular as far as possible none of the wind power installations WT1 to WT4 should consume power. The wind power installations WT1 to WT4, which may thus also be referred to synonymously as wind turbines, are illustrated because they are used to acquire the values explained in the first part A. By way of example, it is possible for in each case corresponding consumers to be connected and to be operated in the vicinity of the two observation nodes 302 and 304, these each consuming the illustrated output power, possibly in addition to the power that the respective wind power installation also still generates itself at the observation node.

It has thus been identified that a specific load flow is then able to be derived on the basis of the acquired node phase angles $\varphi_1$ to $\varphi_4$. Changes in the grid portion that is illustrated here by the three transmission lines may lead to changes in the relationship between the four illustrated node phase angles, that is to say here in particular to a change in the respective differences between two adjacent node phase angles. If such changes in these phase angle relationships thus arise, then this may be used to conclude as to changes in the grid portion.

One change could for example be that the first node phase angle $\varphi_1$ increases from −30° to −15°. If the other node phase angles $\varphi_2$ to $\varphi_4$, and therefore also their ratios to one another, remain unchanged, it is possible to derive therefrom that power is no longer flowing between the observation nodes 301 and 303. In the observation node 303, the fed-in power would thus have risen by 1 GW, since the relationship between the node phase angles $\varphi_3$ and $\varphi_4$ of the observation nodes 303 and 304 has not changed, meaning that 2 GW are still flowing from the observation node 303 to the observation node 304.

Depending on how quickly the relationship between the two node phase angles $\varphi_1$ and $\varphi_3$ changed, it is possible to conclude as to the type of fault. If the node phase angle $\varphi_1$ rose gradually, then the fed-in power was ramped down at the observation node 301. If it rose suddenly, then a large generator was possibly disconnected from the grid.

It is pointed out, as a precautionary measure, that a wind power installation is at present not able to generate a power of 1 GW. At least an especially large wind farm would be required for this purpose. In this respect too, FIG. 3 is intended only to illustrate that the wind power installations are able to perform measurements. The deactivation, mentioned above by way of example, of a large generator may thus mean that the wind power installation WT1 is arranged at the observation node 301 and, at least in the vicinity thereof, a large generator is likewise connected there and was feeding in at least at the beginning. The wind power installation may thus carry on measuring even after the generator has been disconnected. It could moreover also carry on measuring even if it were to be disconnected from the grid itself or if it is representative of a wind farm and this were to be disconnected from the grid.

FIG. 3 thus indicates that wind power installations may be used to acquire grid statuses such as power flows. They may be distributed over the grid and thereby record the node phase angles at a large number of locations. This does not necessarily have to be performed by wind power installations, but using wind power installations to do this is an efficient solution.

Figure 4:
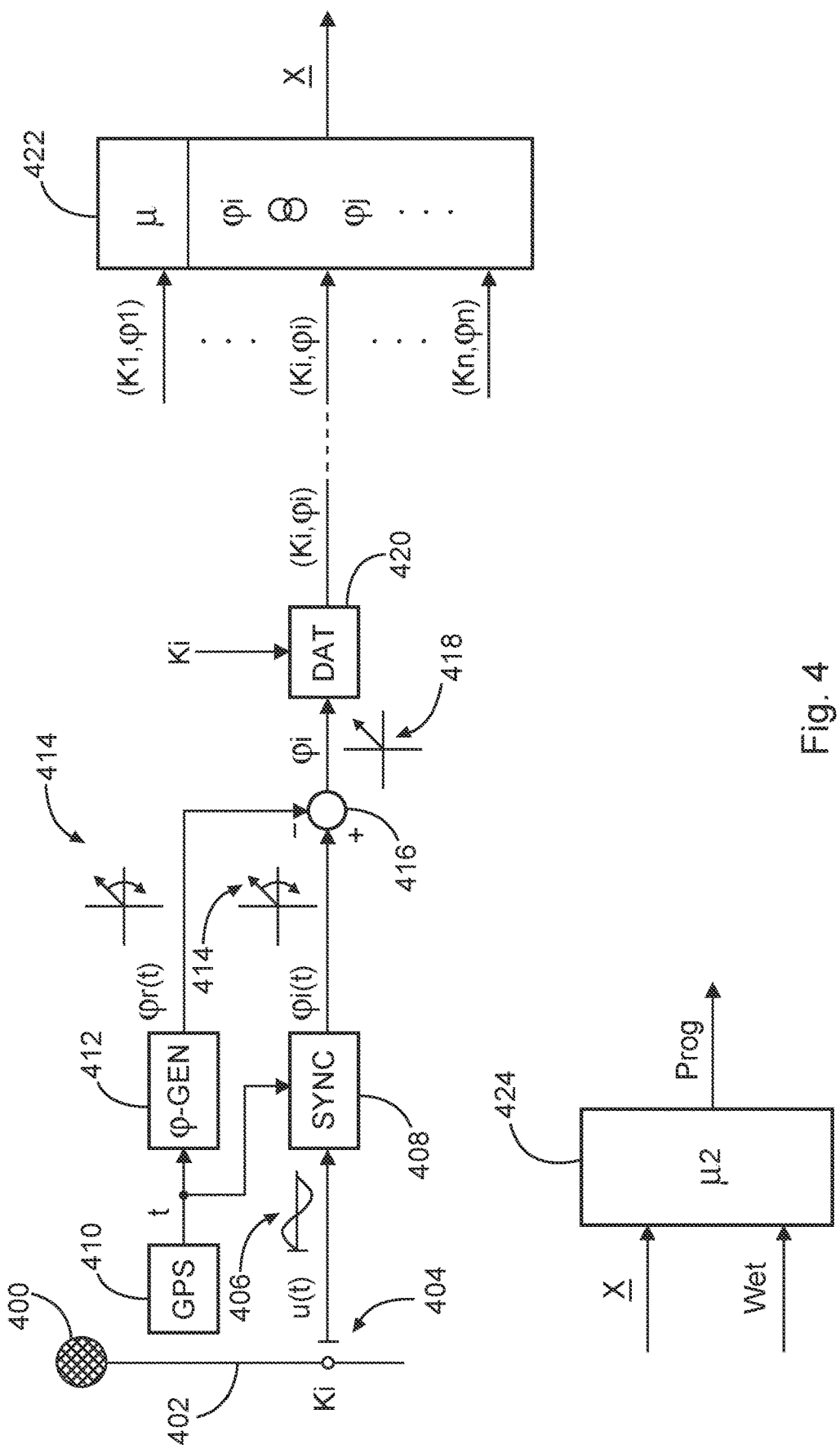
FIG. 4 shows a structural diagram for explaining the method.

FIG. 4 shows a structural diagram for acquiring and further processing the node phase angles. For this purpose, at the beginning, specifically at the top left in FIG. 4, an electricity supply grid 400 is indicated with an exemplary transmission line 402 and an exemplary grid node Ki. It is thus the ith grid node that is considered. A voltage measurement sensor 404 is also indicated on the grid node Ki, such that this grid node Ki also constitutes a node location. All of the grid nodes described in this example are also node locations, such that Ki also stands for a node location.

A grid voltage u(t) is thus acquired at this node location Ki as time signal. An electricity supply grid usually operates in three phases, but for the sake of simplicity only one phase is considered and illustrated here. In any case, a voltage signal symbol 406 illustrates that a voltage time signal has been acquired at the node location Ki. This voltage time signal is input into a synchronization block 408. The synchronization block 408 receives an accurate time signal t from a corresponding signal block 410. The signal block 410 may be part of a global positioning system GPS, which is indicated in the block, but it may also be implemented in another way.

The same highly accurate time signal t is also received by a reference signal generator 412. This reference signal generator 412 thus generates a reference signal, specifically a reference phase angle $\varphi r(t)$. This signal is thus output by the reference signal generator 412, and this reference phase angle $\varphi r(t)$ thus forms a revolving phase angle. This is illustrated by the dynamic phase angle symbol 414.

The synchronization block 408 on the other hand outputs the phase angle $\varphi i(t)$ acquired at the node location Ki, which likewise forms a revolving phase angle and may thus likewise be illustrated by a dynamic phase angle symbol 414. The reference phase angle $\varphi r(t)$ and the phase angle $\varphi i(t)$ of the node location Ki are not necessarily the same, but may be illustrated by the same dynamic phase angle symbol 414.

Both phase angles $\varphi r(t)$ and $\varphi i(t)$ however revolve at the grid frequency. They thus revolve synchronously as long as a stationary or quasi-stationary state is present. They then differ at most by a node phase angle $\varphi i$. This node phase angle $\varphi i$ thus results as the difference between the phase angle $\varphi i(t)$ and the reference phase angle $\varphi r(t)$, and this difference is formed at the summing point 416. The result is thus the node phase angle $\varphi i$ that does not revolve at the grid frequency, but rather forms a fixed value as long as the system is in a stationary or quasi-stationary state. This is indicated by the static phase angle symbol 418.

For further processing, the associated node location Ki is assigned to the node phase angle $\varphi i$. This is symbolized by the data block 420 in which these two values are combined to form a data packet. The result is thus a corresponding data packet, which is illustrated here as (Ki, $\varphi i$).

This data packet (Ki, $\varphi i$) is then transferred to a central evaluation apparatus 422 for further processing. This central evaluation apparatus 422 may be arranged far away from the other elements explained. It may additionally receive data packets (K1, $\varphi 1$)-(Kn, $\varphi n$) from node locations of the entire electricity supply grid or at least of the grid portion under consideration.

A variety of calculations may be performed in the central evaluation apparatus 422, in particular a variety of comparisons may be made between node phase angles $\varphi i$ and $\varphi j$ of different node locations. It is in particular possible to form differences between in each case two such node phase angles.

Further evaluations are added, such as acquiring temporal changes both in the node phase angles themselves and temporal changes in the relationships between node phase angles, that is to say for example a temporal change in a difference between two node phase angles. Grid statuses distributed over the grid topology may be ascertained therefrom, and this is illustrated by the status vector x.

The synchronization block 408 may moreover be considered to be an angle determination apparatus, or to contain same, since it determines the assigned phase angle $\varphi i(t)$ from the time signal. The data block 420 may be in the form of an assignment apparatus or contain same or symbolically represent same. Such an assignment of an associated node location to the node voltage specifically takes place in the data block 420. The assignment to the node voltage takes place here such that it is assigned to the node phase angle. The node location may also be assigned to the as yet unevaluated voltage signal at the beginning. The described processing steps do not change the assignment.

In a lower part of FIG. 4, the structural diagram also still illustrates the possibility of creating a forecast for the electricity supply grid from the grid statuses x together with data from a weather forecast. A time-dependent and location-dependent power forecast may in particular be created. However, a forecast for an expected local level of grid use and/or an expected transmission bottleneck in the grid topology may also be considered.

For this purpose, the grid statuses x and the weather forecast data Wet are input into the forecast block 424. The result thus output by the forecast block 424 are data of a forecast Prog.

Figure 5:
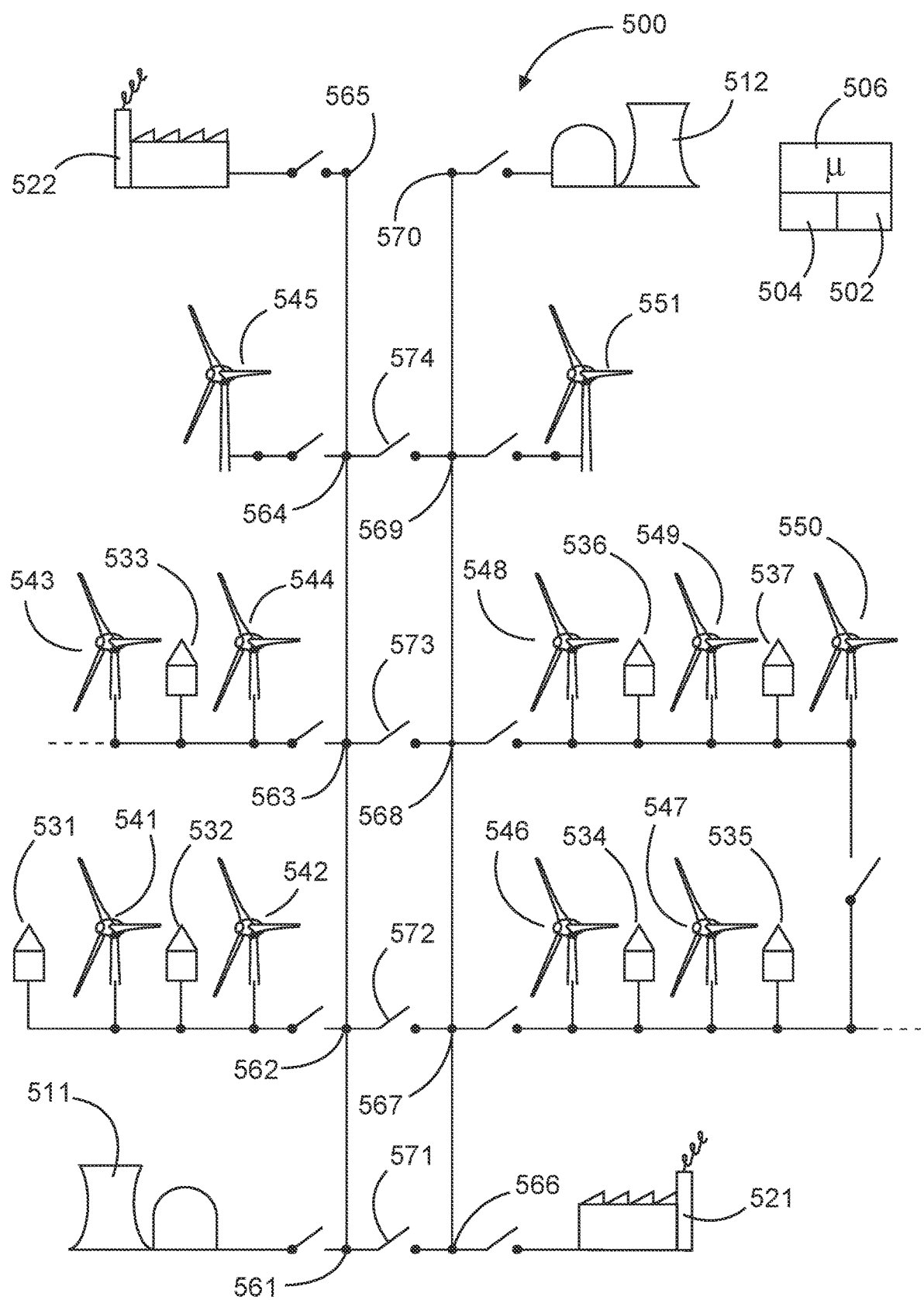
FIG. 5 shows a simplified illustrative illustration of a portion of an electricity supply grid.

FIG. 5 illustrates a grid portion 500 of an electricity supply grid. For monitoring purposes, provision is made for an evaluation apparatus 502, e.g. circuitry, and a checking apparatus 504 e.g. circuitry, which are arranged in a central control center 506, e.g. controller.

FIG. 5 shows, highly schematically, a few elements, specifically a first and second power plant 511 and 512, a first and second industrial consumer 521 and 522, seven further consumers 531 to 537 and eleven wind power installations 541 to 551. The seven further consumers 531 to 537 are each illustrated, for the sake of simplicity, as a house, and they may thus represent a village, but also represent other consumers, such as for example an electric charging station. The wind power installations 541 to 551 may also be different, and some of them may form individual wind power installations and some of them may represent wind farms. They may also each all represent a wind farm.

What is important however is that each of these wind power installations 541 to 551 (or the wind farm) serve to record measurements and thus the respective grid connection point at which they feed in, which is not illustrated in FIG. 5 however for the sake of simplicity, thus in each case forms an observation node. The illustrated grid portion 500 thus has eleven observation nodes, which are equated here to the eleven wind power installations 541 to 551 for the sake of simplicity.

The grid portion 500 additionally has a variety of node points, which each, as long as they do not belong to a switch, form a grid node, of which only ten grid nodes 561 to 570 are numbered consecutively for the sake of improved clarity. A variety of circuit breakers are also illustrated, these normally being closed and all being illustrated in open form in FIG. 5 only for the sake of improved clarity. Only four line circuit breakers 571 to 574 are numbered consecutively for the sake of improved clarity.

The line circuit breakers are also otherwise shown only illustratively. Said line circuit breakers 571 to 574 are thus in particular each illustrated in the middle of two transmission lines. The line circuit breaker 571 is thus for example illustrated on a transmission line between the two grid nodes 561 and 566. Of course, a respective line circuit breaker would normally be arranged on each grid node.

A variety of transmission lines are also illustrated, specifically in particular a respective one between two grid nodes and also a respective one between a grid node and a generator or consumer, or between a consumer and a generator. These grid portions are not provided with reference signs for the sake of improved clarity.

The wind power installations 541 to 551 are thus able to acquire measured values at their respective observation nodes, in particular the ones that have each also been illustrated in the first portion of FIG. 3. As a result, they are each able to output a node phase angle $\varphi_1$ to $\varphi_{11}$ for their observation node and transmit it to the central control center 506. Transmission lines for data are not illustrated for the sake of simplicity. However, any wind power installation or the wind farm that it represents may in particular communicate bidirectionally with the central control center 506.

FIG. 5 is intended to illustrate different grid disturbances and the consequences thereof. By way of example, the two power plants 511 and 512 could also normally feed in a large amount of power, and the two industrial consumers 521 and 522 could consume a large amount of power. In such a state, a large amount of power flows from the first power plant 511 to the first industrial consumer 521 and from the second power plant 512 to the second industrial consumer 522.

If a disturbance then occurs in the first industrial consumer 521, then it is possible for the line circuit breaker between the node 566 and the first industrial consumer 521 to be opened. This leads to a phase jump at the node 566, and this is able to be acquired to the greatest extent by the wind power installation 546, that is to say the observation node assigned there. Slightly later, this phase jump will also propagate further and then be able to be observed next at the wind power installations 542, 548 and 547 or their respectively assigned observation nodes, which is not repeated every time below. Slightly later still, this change may for example be able to be observed at the wind power installations 541, 544, 551 and 549. A corresponding wave of a phase angle jump, which runs with a possibly less jumpy shape at a greater distance from the node 566, thus travels through the grid or the grid portion 500 that is shown.

The fact that it has now been accurately identified when which wind power installation observed what phase angle jump or what phase angle change makes it possible to conclude, from this wave movement, as to the location and the fact that the industrial consumer 521 has been disconnected.

Depending on the magnitude of the disturbance thus identified, it is in particular possible to prompt the wind power installations located in the vicinity to feed in less power, since less power is consumed and thus less is required due to the disconnection of the industrial consumer 521. In addition to the phase angle jump, at this time there is thus also a power excess, which was able to be identified through this phase angle jump. The direction of the phase angle jump is thereby of course also evaluated. Reference is made to the explanation regarding FIG. 3 for statements that may be drawn from the corresponding direction.

A further disturbance is described below by way of illustration, this possibly also arising due to the disconnection of the industrial consumer 521. A majority of the power fed in by the first power plant 511 could then in this case look for a new destination and thus ultimately also flow, in the grid portion 500, in the direction of the second large power plant 512. This may lead to the power infeed of the large power plant 512 declining. However, an excessive amount of power will then very quickly be available in the large power plant 512, which is then fed in and could then flow, in the manner of a wave, back in the direction of the first large power plant 511.

All this is a highly illustrative depiction, but it is in any case possible for there to be a power oscillation between the two large power plants 511 and 512. To counteract this, for example, some wind power installations, for example in particular the wind power installations 551 in the vicinity of the second large power plant and 542 in the vicinity of the first large power plant, could reduce or increase their power infeed anti-cyclically, as it were.

A topology changeover may however also be considered, for example. It may also in particular be considered to divert the power flow by opening or closing in each case one of the line circuit breakers 571 to 574.

A further possible disturbance is a cascaded split. The cascaded split could also begin with the disconnection, already outlined above, of the industrial consumer 521. One consequence could be that—this is in particular also outlined for the purposes of the illustration—the first large power plant 511 is disconnected from the grid. The reason could be a resulting overvoltage or an increase in the fed-in current due to the already described power oscillation. However, the reason may also be a manual disconnection of this first large power plant 511 from a control center.

If a majority of the generated power from the large power plant 511 is or was required for the first industrial consumer 521, and this industrial consumer 521 disconnects from the grid, the consequence is that there is far too much power generated by the first large power plant 511 in the grid, which could prompt a manual grid split. It may be left open whether such a manual disconnection is a human error or the correct decision.

In any case, such a second disconnection would result in another phase jump that is detected first at the wind power installation 542, and then only slightly later at the wind power installations 546 and 544, and even later at further wind power installations. A second wave of the node phase angles has thus been identified, this having started slightly later and having a slightly different origin.

A further consequence may be that there is too little power in the grid portion 500 following deactivation of the large power plant 511. If for example the two wind power installations 541 and 542 are then currently feeding in only very little power, in any case significantly less than the consumers 531 and 532 require, then an excessively high current possibly flows at the grid node 562 in the direction of these consumers. The line circuit breaker between the wind power installation 542 and the grid node 562 could trip.

This would result in the third disconnection, here the disconnection of a grid portion. This could also be detected by the other wind power installations. Of the wind power installations still remaining in the grid portion 500, this would possibly first be identified at the wind power installations 546 and 544, until it propagates to further wind power installations.

A cascaded split may thereby be identified, and countermeasures may be initiated. If the disconnection is able to be located well, it may also be identified which power inflows or outflows have been disconnected in each case, and the power deficit or the power excess may thus quickly be identified and compensated for through an appropriate control operation. In this case too, it is possible in particular to quickly adapt the power of the wind power installations, since these are very fast regulation units in the electricity supply grid. For brief measures, these are also able to temporarily provide a significant power increase.

A further disturbance identified may also be the isolation of a transmission line. If for example the line circuit breaker 572 is opened, and therefore the transmission line between the nodes 562 and 567 is thus opened, then the ratio between the node phase angles of the two wind power installations 542 and 546 changes. Other wind power installations are also able to detect effects, but these two wind power installations detect the greatest effect, and this disconnection is thus also able to be located.

It is likewise possible to identify the disconnection of a sub-grid, also referred to as system split. By way of example, it is possible to identify when all four line circuit breakers 571 to 574 are open. This may occur for example when one or more transmission lines need to be deactivated for maintenance reasons or for other reasons, and only two or possibly even only one of said four line circuit breakers is closed.

The severe power outage in the European integrated grid on 4 Nov. 2006 may in particular be given here by way of simplification. A high-voltage link with two transmission lines was deactivated then in order to deliver a cruise ship. This could for example be the transmission lines 571 and 572. In that case, there was additionally a large power flow, which could be illustrated for example by a power flow from the "right-hand side of FIG. 5" to the "left-hand side of FIG. 5." The four line circuit breakers 571 to 574 thus form the split between these two sides. All of the power could then however still be transmitted via the transmission lines of the remaining line circuit breakers 573 and 574 that are supposed to be closed.

The problem that was overlooked however was that one of these two transmission lines was likewise disconnected for maintenance purposes. The result was that, if for example the circuit breaker 573 was unintentionally opened, the entire power then had to flow through the transmission line having the line circuit breaker 574. This however exceeded the permitted transmission power and then likewise led to a safety deactivation. This too is of course illustrated in a highly simplified manner.

In any case, the circuit breaker 574 is then opened as the last of the four mentioned, and this is reflected immediately in the phase angles as it were of the wind power installations remaining in the right-hand part, on the one hand, and the wind power installations remaining in the left-hand part, on the other hand. It is then possible to immediately identify what problem is present.

The magnitude of the power previously transmitted via the lines also gives the magnitude of the power deficit resulting from the disconnection on one side and of the power excess on the other side.

This could also be read from the node phase angles, as was explained in FIG. 3. The wind power installations on the right-hand side could in particular accordingly immediately reduce their power in order to reduce the power excess there. On the other hand, a power increase together with the ramping down or emergency deactivation of some consumers in the left-hand part could be performed.

Moreover, the event of 4 Nov. 2006 would possibly have been able to be prevented, since the increased power flow would already have been able to be identified owing to the power deactivated for maintenance purposes. The imminent instability would have been identified at the latest following the isolation. It would have been possible to respond thereto, specifically by immediately reducing the power generation "on the right-hand" side of the wind power installations. The transmission power over the remaining single transmission line would then possibly have been able to be lowered quickly enough to a permissible extent. In fact, immediately before the event on 4 Nov. 2006, a large amount of power had been transmitted from wind power installations. The wind power installations in question could have immediately reduced their power by way of an appropriate control command.

As mentioned, the process on 4 Nov. 2006 was of course far more complex and has been given here only for the purpose of improved explanation.

It is also possible to identify a topology changeover, to cite a further example of a disturbance. A topology changeover may be one of said disconnections of the transmission line, that is to say the isolation of the line circuit breakers 571 and 572, but a topology changeover may also in particular be such that one circuit breaker has been opened and another one has been closed. By way of example, the line circuit breaker 574 could be opened and the line circuit breaker 573 could be closed, for whatever reason.

In the same way as before, a large number of transmission lines "from the right-hand to the left-hand side" are thereby still available, even with the same capacity, but the channeling of the power flow has nevertheless changed. In particular the power flow from the second large power plant 512 to the second industrial consumer 522 has changed. The wind power installations 544, 545, 548 and 551 may in particular identify this change of topology best at the acquired node phase angles or the evaluation apparatus 502 may identify this on the basis of the node phase angles that these four said wind power installations deliver.

It is also possible here that no support measure needs to be taken, or, due to the now extended path of said power flow, voltage support measures able to be carried out by some wind power installations could come into consideration.

The following has in particular been identified according to the disclosure.

In distributed three-phase current grids, load flows and dynamic effects between the nodes give rise to phase shifts in the node voltages (static and dynamic). The shift results primarily from the voltage drop across the grid impedance (static) and is greater the greater the grid impedance and the greater the load flow via the grid impedance. Grid oscillations and disturbances however also run through the grid and are able to be identified in a response of the voltage angles at the grid nodes. Overall, the static phase shift from the grid center may be up to +/−90°.

It has also been identified that an operator of wind power installations may have access to thousands of measurement points of the voltage in the grid, and may thus have access to considerably more measurement points than the other grid operators. One idea is to use the information about the distribution of the grid phase angles to identify dynamic grid effects and stability limits.

A proposal has been found to thereby assess grid stability. This makes it possible to identify power oscillations and also to identify grid disturbances and topology changeovers that influence grid stability.

It also becomes possible to identify grid disturbances and dynamic effects, in particular a system split, a cascaded split of grid sections, generators and consumers, a failure of lines and loss of redundancy and short circuits. It is possible to identify power oscillations and to assess stability and activate measures for improving stability. It is also possible to identify dynamic effects and a response thereto.

One idea is to acquire and to evaluate the voltage angle of the grid voltage at as far as possible all wind power installations (or alternatively at all wind farms). The following information, or some of it, should in this case be present in situ:

Highly precise time information, a GPS or another time signal, reference angle and reference time, voltage angle information (phase shift with respect to the reference angle).

Some of the information may be obtained from an inverter controller, from a grid data monitoring module (external or internal evaluation), or from measurements on a farm controller or a farm control unit (FCU).

One proposal is to mark the measured voltage vector with a time signal and to evaluate it centrally for system-wide use. In this case, time delays in the communication between the time module and the grid measurement module should be as small as possible, or at least always of the same length.

It is proposed for the angle information to be evaluated together with the location at a central center. It is possible to calculate a precise image of the relative load flows in the grid between the grid nodes therefrom. The optional enrichment with static topological grid information makes it possible to determine the following in real time:

A grid group assignment of a wind power installation in the distribution grid (to which transmission grid nodes which wind farm is currently operatively connected). It is also possible to determine a current topological structure of the grid (switch positions, busbar interconnections, deactivations of lines).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for monitoring an electricity supply grid, wherein the electricity supply grid has:
   a grid frequency, and
   a grid topology with a plurality of grid nodes,
   a plurality of converter-controlled infeed units are each connected to the electricity supply grid via a grid connection point, and
   wherein the grid connection points are distributed over the grid topology, the method comprising:
   acquiring, in each case, at least one node voltage at the grid connection point or at a grid node assigned to the grid connection point, of the plurality of grid nodes such that a plurality of node voltages are acquired, wherein:
   each grid connection point or grid node is assigned a node location in the grid topology, and
   the acquired node voltage has a node phase angle as phase angle of the node voltage,
   assigning an associated node location to each node voltage, and
   ascertaining grid statuses distributed over the grid topology from the acquired node voltages, each with an assigned node location, from the node phase angles of at least two grid nodes or phase relationships between at least two grid nodes.

2. The method as claimed in claim 1, wherein ascertaining grid statuses comprise statuses from at least one bullet point from the list containing:
   power flows between grid nodes,
   switching states defining the grid topology,
   transmission bottlenecks in the grid topology,
   a renewable infeed proportion,
   a conventional infeed proportion and a grid load.

3. The method as claimed in claim 1, wherein at least one forecast regarding:
   at least one expected local level of grid use, and/or
   at least one expected transmission bottleneck in the grid topology is determined based on the ascertained grid statuses and at least one weather forecast.

4. The method as claimed in claim 1, wherein:
   each node voltage is assigned a highly accurate measurement time that has an accuracy of at least one five-hundredth of the inverse grid frequency, and/or
   a common reference time is taken as a basis for acquiring the node voltages of all node locations for comparing times of the node voltages, wherein the common reference time is provided a time signal of a GPS.

5. The method as claimed in claim 1, wherein:
   a node phase angle is acquired for each node location, and/or
   a common reference angle is provided for the node voltages of all node locations, and each node phase angle is determined as an angle shift with respect to the reference angle, and/or
   a local phase angle difference is determined as a difference between the respective node phase angles for in each case two node locations.

6. The method as claimed in claim 5, wherein a power flow in a connection path is determined from at least one local phase angle difference between two node locations connected via the connection path.

7. The method as claimed in claim 1, wherein:
   a plurality of wind power installations or wind farms at the electricity supply grid are connected to the electricity supply grid, in each case, via one of the grid connections points, and each has an installation control system for controlling the wind power installation or a central farm control system for controlling the wind farm, and voltage values acquired by the installation control system or the central farm control system are used to acquire, in each case, one of the node voltages.

8. The method as claimed in claim 1, wherein a grid status image is created from the node voltages and the respectively assigned node location, wherein the grid status image reflects the grid statuses distributed over the grid topology, wherein power flows distributed over the grid topology.

9. The method as claimed in claim 8, wherein:
in each case, one of the node voltages is described by a voltage vector with a time signal,
the voltage vectors are determined for each of the node locations,
the voltage vectors are evaluated in a central computer, and
the grid status image is created from the voltage vectors and the respectively assigned node location.

10. The method as claimed in claim 9, wherein:
the grid topology has a plurality of spatially distributed transmission nodes, wherein one transmission node, in each case, corresponds to one of the grid nodes, and
the grid status image has a grid group assignment of existing wind power installations or wind farms that, in each case, at least indicates, for a plurality of the transmission nodes, the wind power installations or wind farms to which it is connected without any interconnection of a further transmission node, and/or reflects the current grid topology.

11. The method as claimed in claim 1, wherein a time-dependent and location-dependent power forecast for available and/or required power, which indicates are respective temporal forecast or a temporal profile of a forecast for power able to be provided and/or required for some or all grid nodes and/or transmission nodes, is created based on the acquired node voltages and a weather forecast,
wherein the location-dependent power forecast is a forecast for power able to be provided by wind power installations and/or wind farms.

12. The method as claimed in claim 8, wherein the grid status image comprises a time-dependent and location-dependent power forecast.

13. The method as claimed in claim 11, wherein:
the electricity supply grid is controlled based on the acquired node voltages based on a grid status image,
the electricity supply grid is controlled by controlling switches of the electricity supply grid to change the grid topology, and/or
one or more of the converter-controlled infeed units are controlled.

14. The method as claimed in claim 1, wherein:
the grid statuses ascertained from the acquired node voltages are compared with measured grid statuses or grid statuses ascertained from measured values other than the node voltages so as to perform a grid status comparison with identical grid statuses that are acquired differently, and
the ascertainment of the grid statuses from the acquired node voltages is adapted based on the grid status comparison to improve an accuracy of the grid statuses.

15. The method as claimed in claim 14, wherein the grid statuses are ascertained from the acquired node voltages using a calculation rule, and the calculation rule is adjusted based on the grid status comparison.

16. A monitoring arrangement for monitoring an electricity supply grid, wherein:
the electricity supply grid has:
a grid frequency, and
a grid topology with a plurality of grid nodes,
a plurality of converter-controlled infeed units are each connected to the electricity supply grid via a grid connection point, and
wherein the grid connection points are distributed over the grid topology, the monitoring arrangement comprising:
a plurality of acquisition apparatuses configured to acquire, in each case, at least one node voltage at the grid connection point or at a grid node assigned to the grid connection point of the plurality of grid nodes such that a plurality of node voltages are acquired, wherein:
each grid connection point or grid node is assigned a node location in the grid topology, and
the acquired node voltage has a node phase angle as phase angle of the node voltage,
at least one assignment apparatus configured to assign an associated node location to each node voltage, and
a central evaluation apparatus configured to ascertain grid statuses distributed over the grid topology from the acquired node voltages, each with an assigned node location from the node phase angles of at least two grid nodes or phase relationships between at least two grid nodes.

17. The monitoring arrangement as claimed in claim 16, comprising at least one angle determination apparatus configured to acquire a node phase angle as phase angle of the acquired node voltage.

* * * * *